United States Patent [19]

Peak et al.

[11] 4,041,365
[45] Aug. 9, 1977

[54] CIRCUIT FOR DETECTING A MALFUNCTION IN AN INVERTER

[75] Inventors: Steven C. Peak; Thomas E. Anderson, both of Normal, Ill.

[73] Assignee: General Electric Company, New York, N.Y.

[21] Appl. No.: 724,803

[22] Filed: Sept. 20, 1976

[51] Int. Cl.² ............................................. H02M 1/18
[52] U.S. Cl. ........................................ 363/58; 363/136
[58] Field of Search .................... 321/11, 12, 13, 14, 321/18, 450, 45 R

[56] References Cited

U.S. PATENT DOCUMENTS

| | | | |
|---|---|---|---|
| 3,418,556 | 12/1968 | Greenberg et al. | 321/45 R X |
| 3,423,665 | 1/1969 | Greenberg et al. | 321/45 R X |
| 3,718,853 | 2/1973 | Graf | 321/12 |
| 3,760,258 | 9/1973 | Percorini et al. | 321/11 |
| 3,821,630 | 6/1974 | Kornrumpf et al. | 321/12 X |
| 3,824,441 | 7/1974 | Heyman et al. | 321/18 X |
| 3,846,694 | 11/1974 | Archer | 321/18 |
| 3,919,620 | 11/1975 | McMurray et al. | 321/13 |

Primary Examiner—William M. Shoop
Attorney, Agent, or Firm—Stephen A. Young; Walter C. Bernkopf; Robert A. Cahill

[57] ABSTRACT

A circuit for detecting a malfunction in an inverter. The circuit includes means coupled to the center tap of a commutating interval current limiting reactor which is connected in series with and interposed between a pair of gate controlled rectifiers for generating a first signal upon detecting and for the duration of an interval when both of the rectifiers are ON. The circuit further provides means, responsive to a first pulse used to initiate an interval when either of the pair of rectifiers is to be "ON", for generating a second signal having a duration greater than the normal duration of the first signal. Also provided is a means responsive to the first and second signals for generating a control signal to cause cessation of the operation of the inverter, if the second signal is absent during the occurrence of the first signal.

5 Claims, 9 Drawing Figures

CIRCUIT FOR DETECTING A MALFUNCTION IN AN INVERTER

BACKGROUND OF THE INVENTION

1. Field of the Invention

This invention relates to a circuit for providing rapid detection of a malfunction in an inverter circuit of the type used in an uninterruptible power system in order to enable the inverter circuit to be turned off or shut down and the uninterruptible power system to be quickly removed from a critical bus.

2. Description of the Prior Art

Self-commutating inverter circuits of the type described in U.S. Reissue Pat. No. Re. 26,342 and assigned to the same assignee as the assignee of the present invention have been used in uninterruptible power systems. These uninterruptible power systems are capable of converting a DC voltage to an AC voltage so as to provide a reliable AC power source to a critical bus, which bus in turn provides power to a critical load, such as a computer. This critical load must have a voltage source which does not deviate in amplitude or frequency from very tight specifications in order to insure its proper operation. Thus, quite often a number or a plurality of uninterruptible power systems are used in redundant fashion to supply the critical bus and load. If, however, there is a malfunction in the inverter of any UPS system, this inverter can adversely effect the overall voltage of the critical bus, thereby endangering the continued operation of computers which receive their power from that bus. One such frequent malfunction which can occur within an inverter circuit used in a UPS system can result when one of the rectifiers in a leg of the self-commutating inverter circuit is falsely triggered ON at a time when it should not be ON. This condition can ultimately result in a shift in the output voltage or possibly the frequency of the total UPS system from its desired value.

OBJECTS OF THE INVENTION

It is therefore an object of this invention to provide a circuit for detecting a malfunction in an inverter circuit used in a UPS system so as to enable the inverter to immediately be shut down, which would in turn aid in the rapid removal of the UPS system from the critical bus.

It is also an object of this invention to provide a circuit for detecting false triggering or commutation of a thyristor in a leg of the inverter to enable the generation of a signal to cause shut down of the inverter.

Other objects of the invention will be pointed out hereinafter.

SUMMARY OF THE INVENTION

According to a broad aspect of the invention, there is provided a circuit for detecting a malfunction in a self-commutating inverter. The circuit includes means, coupled to the center tap of a commutating interval current limiting reactor which is connected in series with and interposed between a pair of gate controlled rectifiers, for generating a first signal upon detecting and for a duration of an interval when both of the rectifiers are on. The circuit further provides means, responsive to a first pulse used to initiate an interval when either of the pair of rectifiers is to be ON. for generating a second signal having a duration greater than the normal duration of the first signal. Also provided is means responsive to the first and second signals for generating a control signal to cause cessation of the operation of the inverter if the second signal is absent during the occurrence of the first signal.

The means for generating the first signal is comprised of a voltage divider network, a full wave rectifier means, a photodiode and a phototransistor amplifier. One input terminal of the rectifier means is connected to the center tap of the reactor, and the other input terminal of the rectifier means is connected to the midpoint of the voltage divider. The photodiode is connected across the output terminal of the rectifier means, and the phototransistor amplifier is optically coupled to the photodiode. During the time when both of the rectifiers are on, the potential at the midpoint of the voltage divider is equal to the potential at the center tap of the reactor, and no current flows through the photodiode, thereby resulting in the generation of a first signal at the output terminal of the phototransistor amplifier. During the remaining time interval when only one of the first and second gate controlled rectifiers is on, the potential at the center tap of the reactor is unequal to the potential at the midpoint of the voltage divider, thereby causing the flow of current through the photodiode, whereupon the first signal at the output of the phototransistor amplifier is extinguished.

The means for generating the second signal is comprised of a one-shot multivibrator that is triggered by the first pulse.

The means for generating the control signal is comprised of an inverting amplifier that is coupled to the output of the one-shot multivibrator, and gating means that is coupled to the output of the inverting amplifier and the output of the phototransistor amplifier, whereby the control signal is generated at the output terminal of the gating means when the first signal is applied to the gating means at a time when there is an absence of the second signal at the output of the one-shot multivibrator.

BRIEF DESCRIPTION OF THE DRAWINGS

FIG. 3c is a timing diagram of the first pulse of gating signals derived from the waveform shwon in FIG. 3a;

DESCRIPTION OF THE PREFERRED EMBODIMENT

Figure 1:
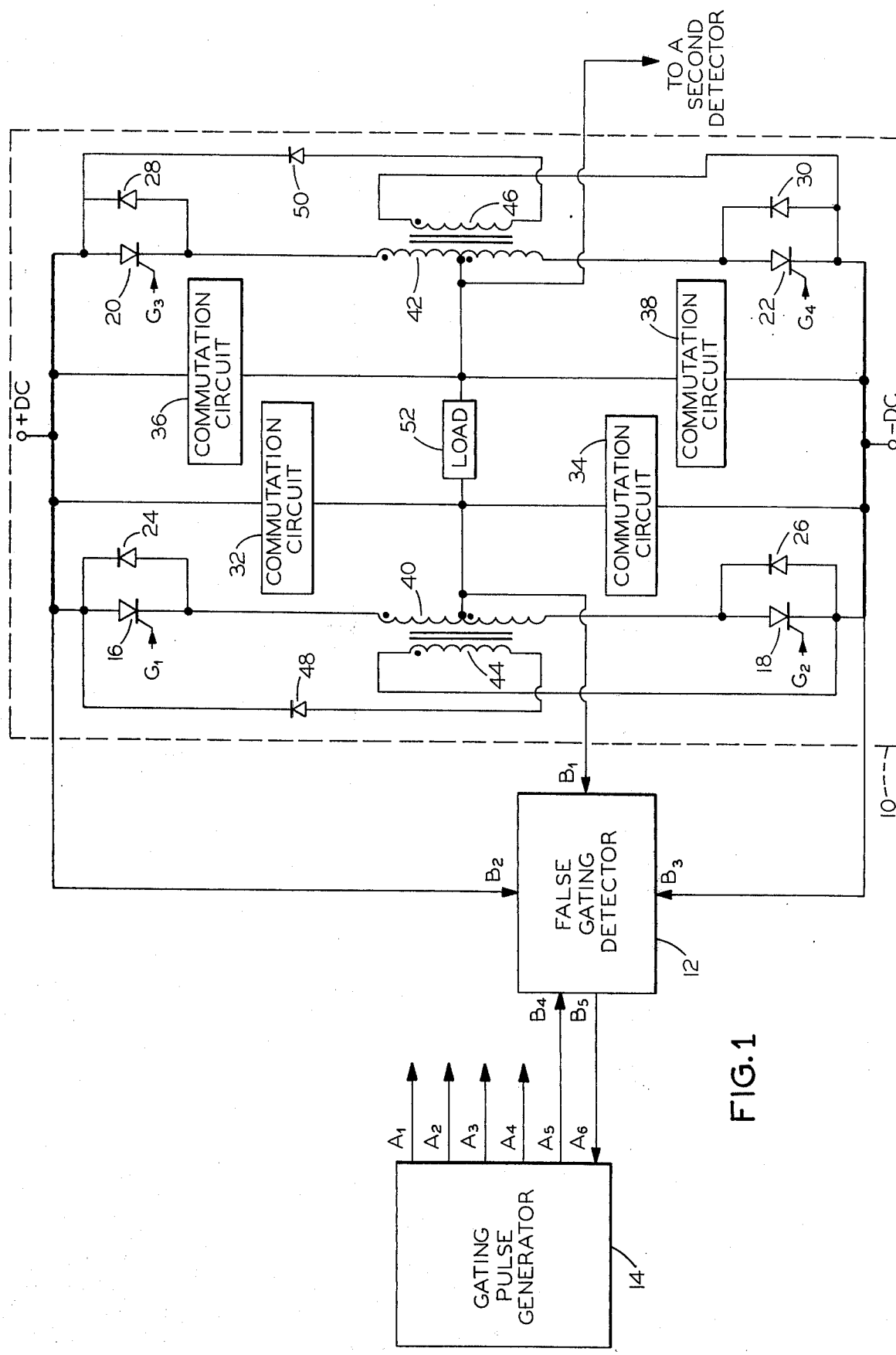
FIG. 1 is an overall circuit diagram of the circuit for detecting a malfunction in a self-commutating inverter.
Figure 2:
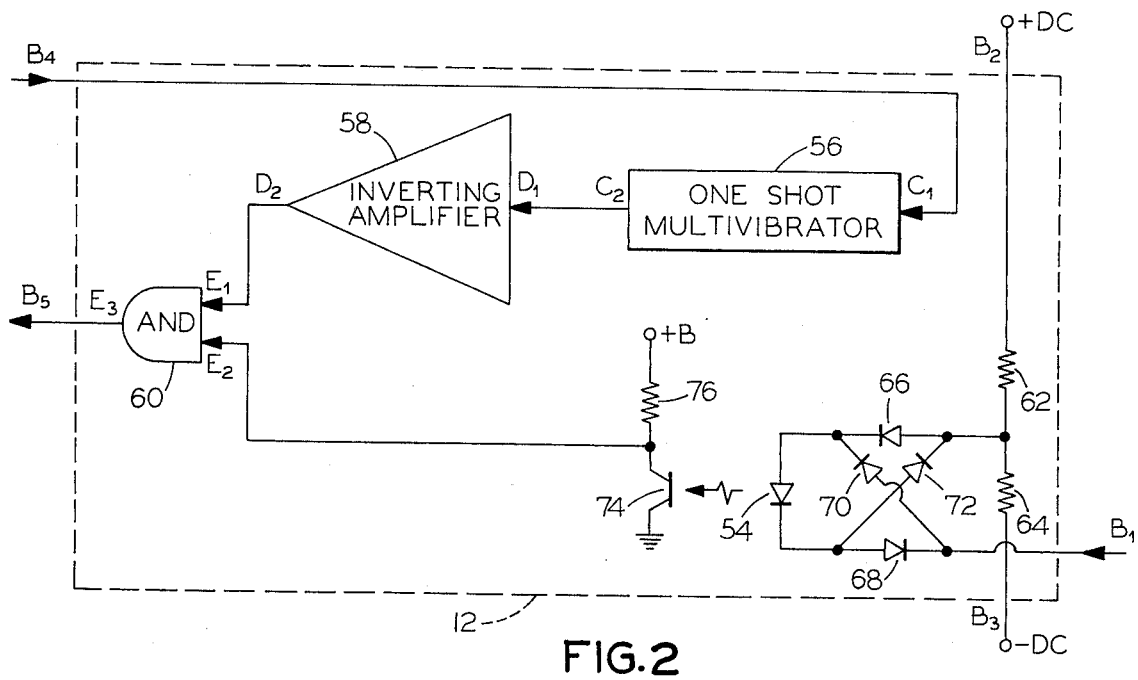
FIG. 2 is a more detailed diagram of the false gating detector shown in FIG. 1.

Referring to FIGS. 1-3, the invention will now be explained. As shown in FIG. 1, there is provided a self-commutating inverter circuit 10, a false gating detector 12, and a gating pulse generator 14.

Inverter circuit 10 is comprised of first and second gate controlled SCR's 16 and 18 within one leg of the inverter circuit and third and fourth gate controlled SCR's 20 and 22 in another leg of the inverter circuit, first, second, third and fourth diodes 24, 26, 28 and 30, first, second, third and fourth commutation circuits 32, 34, 36 and 38, first and second current limiting (spanning) reactors 40 and 42, first and second secondary windings 44 and 46 and first and second blocking diodes 48 and 50. Diodes 24, 26, 28 and 30 are respectively connected in anti-parallel relationship across respective SCR's 16, 18, 20 and 22. Reactor 40 is connected between the cathode of SCR 16 and the anode of SCR 18, while reactor 42 is connected between the cathode of SCR 20 and the anode of SCR 22. The anodes of SCR's 16 and 20 are electrically connected to the + DC terminal of a DC power supply (not shown), while the cathodes of SCR's 18 and 22 are electrically connected to the − DC terminal of the DC power supply. Commutation circuits 32 and 36 are electrically connected to the + DC terminal and the center taps of respective reactors 40 and 42, while commutation circuits 34 and 38 are electrically connected to the − DC terminal and the center taps of respective reactors 40 and 42. Secondary windings 44 and 46 are respectively inductively coupled as shown in FIG. 1 to respective reactors 40 and 42, wherein one end of secondary windings 44 and 46 are electrically connected to the − DC terminal, while the other end of windings 44 and 46 are electrically connected to the respective anodes of blocking diodes 48 and 50. The cathodes of blocking diodes 48 and 50 are electrically connected to the + DC terminal. The center tap of respective reactors 40 and 42 provides an effective output terminal for each leg of the inverter, and a load 52 is connected between the respective center tap terminals of reactors 40 and 42.

Respective gate terminals $G_1$, $G_2$, $G_3$ and $G_4$ of respective SCR's 16, 18, 20 and 22 are electrically connected to receive gating pulses from respective output terminals $A_1$, $A_2$, $A_3$ and $A_4$ of gating pulse generator 14. The pulses shown in FIG. 3d would, for example, be applied from terminals $A_1$ and $A_4$ of gating pulse generator 14 to respective gating terminals $G_1$ and $G_4$ of SCR's 16 and 22 so that these SCR's would be switched ON during timing cycles $T_1$ and $T_3$ shown in FIGS. 3a, while gating pulses shown in FIG. 3e would be applied from terminals $A_2$ and $A_3$ of gating pulse generator 14 to respective gating terminals $G_2$ and $G_3$ of respective SCR's 18 and 20 so that these SCR's would be switched ON during period $T_2$ shown in FIG. 3a.

A more detailed description with regard to the circuit details and operation of inverter circuit 10 is shown in U.S. Reissue Pat. No. Re. 26,342 assigned to the same assignee as the assignee of the present invention. Also, a further description of gating sources used to generate desired gating pulses shown in FIGS. 3d and 3e in accordance with the desired SCR switching waveform shown in FIG. 3a, to be applied to the gates $G_1$, $G_2$, $G_3$ and $G_4$ of respective SCR's 16, 18, 20 and 22, can be found in Chapter 4 of The Silicon Controlled Rectifier Manual, Second Edition, published by the General Electric Company in 1961.

Figure 3A:
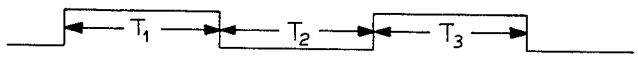
FIG. 3a is a timing diagram of the desired SCR switching waveform for the inverter circuit.
Figure 3B:
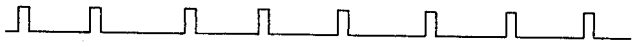
FIG. 3b is a timing diagram of an asynchronized randomly generated pulse train generated within the gating pulse generator.
Figure 3C:
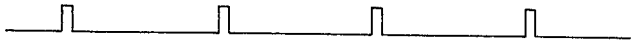

Referring again to FIG. 1, the center tap terminal of reactor 40 is electrically connected to an input terminal $B_1$ of false gating detector 12, while the + DC terminal and the − DC terminal are electrically connected to respective input terminals $B_2$ and $B_3$ of the false gating detector. What is defined as a first pulse, which is shown in FIG. 3c, has its leading edge derived from a point in time when it is desired that one of the two SCR's in an inverter leg is to be triggered on to initiate a commutation cycle. The first pulses are thus derived within gating pulse generator 14 from each transition in the waveform shwon in FIG. 3a using standard pulse generation techniques, and are coupled from an output terminal $A_5$ of the gating pulse generator to an input terminal $B_4$ of false gating detector 12. False gating detector 12 provides a means for generating a control signal at an output terminal $B_5$, which is coupled to an input terminal $A_6$ of gating pulse generator 14, to cause a cessation in the generation of trigger pulses to the gates of the SCR's of inverter circuit 10 to shut the inverter down when a malfunction hereinafter described is detected within the selfcommutating inverter circuit.

As shown in FIG. 2, false gating detector 12 is comprised of a full wave rectifier, a photodiode 54, a phototransistoramplifier, a one-shot multivibrator 56, an inverting amplifier 58 and an AND gate 60. The voltage divider is comprised of respective first and second resistors 62 and 64 connected together at a midpoint or output terminal of the voltage divider. That terminal of resistor 62 which is not connected to resistor 64 is connected, via terminal $B_2$ of the false gating detector, to the + DC terminal of the power supply, while that terminal of resistor 64 which is not connected to resistor 62 is connected, via terminal $B_3$ of the false gating detector, to the − DC terminal of the power supply. The full wave rectifier is comprised of diodes 66, 68, 70 and 72. The cathode of diode 72 is electrically connected to the anode of diode 66 to form one input terminal of the full wave rectifier which is electrically connected to the output terminal of the voltage divider. The anode of diode 70 is electrically connected to the cathode of diode 68 to form a second input terminal of the full wave rectifier which is electrically connected, via terminal $B_1$ of the false gating detector, to the center tap of spanning reactor 40. The cathodes of diodes 70 and 66 are electrically connected together to form one output terminal of the full wave rectifier which is electrically connected to the anode of photodiode 54. The anodes of diodes 72 and 68 are electrically connected together to form a second output terminal of the full wave rectifier which is electrically connected to the cathode of photodiode 54. The phototransistor-amplifier is comprised of a phototransistor 74 and a resistor 76. The base of phototransistor 74 is optically coupled to photodiode 54, while the emitter of the phototransistor is electrically connected to the circuit ground, and the collector of the phototransistor is electrically connected via resistor 76 to a + DC terminal of the power supply. An input terminal $C_1$ of one-shot multivibrator 56 is electrically connected, via terminal $B_4$ of false gating detector 12, to output terminal $A_5$ of the gating pulse generator. An output terminal $C_2$ of the one-shot multivibrator 56 is electrically connected to an input terminal $D_1$ of inverting amplifier 58 which inverts the level of the signal received at its input from high to low and low to high.

An output terminal $D_2$ of the inverting amplifier applies the inverted signal to one input terminal $E_1$ of AND gate 60, while the collector of phototransistor 74 is electrically connected to another input terminal $E_2$ of AND gate 60. When high signal levels are applied at both input terminals $E_1$ and $E_2$ of AND gate 60, a control signal is generated at an output terminal $E_3$ of the AND gate, and is coupled, via terminal $B_5$ of the false gating detector, to input terminal $A_6$ of the gating pulse generator to cause discontinuance of the generation of the gating pulses to be applied to the SCR's of inverter circuit 10, thereby causing shut down of the inverter circuit. This discontinuance of generation of pulses within gating pulse generator 14 can be accomplished by simply using the control signal received at input terminal $A_6$ to control an electronic switch, such that when the control signal is applied to the electronic switch, it causes an interruption in the flow of power to the pulse generating circuits, and, if desired, to an uninterruptible power system (UPS).

The overall circuit operation will now be explained. Once the desired output of the self-commutating inverter circuit is determined, the length of the time periods when SCR's 16 and 22 are to be ON, and then when SCR's 18 and 20 are to be ON, will correspond to the waveform shown in FIG. 3a, wherein time periods $T_1$ and $T_3$ correspond to the period when SCR's 16 and 22 are to be ON, and time period $T_2$ corresponds to the time when SCR's 18 and 20 are to be ON. Using the leading and trailing edges of the waveform shown in FIG. 3a, first pulses shown in FIG. 3c are generated using standard pulse generating techniques, wherein the leading edge of the first pulses coincides with the leading and trailing edge of the waveform shown in FIG. 3a. Gating pulse generator 14 can also provide (using standard pulse generating techniques) a randomly generated asynchronized pulse train as shown in FIG. 3b, wherein the pulse train can be combined with the first pulse generated in FIG. 3c, and using standard gating techniques, the pulse train shown in FIG. 3d can be applied to SCR's 16 and 22, while the pulse train shown in FIG. 3e can be applied to SCR's 18 and 20.

Figure 3D:
FIG. 3d is a timing diagram of the gating pulses to be applied to the gate of one SCR of each inverter leg.
Figure 3E:
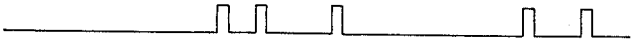
FIG. 3e is a timing diagram of the gating pulses to be applied to the gate of the other SCR of each inverter leg.
Figure 3F:
FIG. 3f is a timing diagram of the output signal generated by the one-shot multivibrator in response to a first pulse.
Figure 3G:
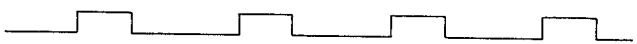
FIG. 3g is a timing diagram of the output of a phototransistor amplifier which shows the generation of pulses during an interval when both SCR's within an inverter leg are ON, which interval is referred to as a spanning interval.

Assuming that SCR's 18 and 20 have been ON for a period of time, as soon as the first pulse of the pulse train shown in FIG. 3d is applied to the gate terminals of SCR's 16 and 22, these SCR's turn ON. Once SCR 16 is ON and SCR 18 has not yet been commutated OFF, the full voltage from the DC power supply is applied across spanning reactor 40, wherein the potential at the center tap of reactor 40 is half the voltage across reactor 40. At this time, it should be noted that the value of resistors 62 and 64 of the voltage divider are selected so that the voltage potential at the mid-point or output of the voltage divider would be equal to the voltage potential at the center tap of the spanning reactor when the full voltage from the DC power supply is applied across the spanning reactor. As soon as the potential at the center tap of reactor 40 is equal to the potential at the output of the voltage divider, voltage across the input and output terminals of the full wave rectifier is zero, and no current flows through photodiode 54. While no current is flowing through photodiode 54, phototransistor 74 is off, and a high level (DC potential) or first signal (shown in FIG. 3g) is applied from the collector of phototransistor 74 to input terminal $E_2$ of AND gate 60. At the same time that the first pulse is applied to the gate terminals of SCR's 16 and 22, it is also applied to input terminal $C_1$ of one-shot multivibrator 56, which causes a second signal (shown in FIG. 3f) to be generated at its output terminal $C_2$.

The duration of this second signal is set so that it is longer than the time when both SCR's 16 and 18 remain ON. The time when both SCR's 16 and 18 remain ON and the full DC supply voltage is applied across the spanning reactor is known as the spanning interval. The time necessary for SCR 18, under these circumstances, to commutate off and its commutation circuit to be charged for a latter commutating cycle is known as the commutation interval. Generally, the spanning interval is one-tenth the time of the commutation interval.

The second signal generated at the output of one-shot multivibrator 56 is applied to the input of inverting amplifier 58, and for the duration of the second signal, a low (zero potential) level disabling signal is applied from the output of inverting amplifier 58 to input terminal $E_1$ of AND gate 60 to prevent a control signal from being generated at output terminal $E_3$ of AND gate 60 during the time when the enabling first signal is applied to input terminal $E_2$ of AND gate 60 from the collector of phototransistor 74. Now, at the end of the spanning interval, when SCR 18 is commutated off, the potential at the center tap of the spanning reactor is no longer equal to the potential at the output of the voltage divider, and therefore a voltage differential appears across the input terminals of the full wave rectifier. This causes current to flow through photodiode 54, which, in turn, causes phototransistor 74 to turn ON and the voltage at its collector to be at a low (circuit ground) signal level. This low level signal is applied to input terminal $E_2$ of AND gate 60 so as to disable the AND gate. Hereinafter, the second (high level) signal, generated at the output of the multivibrator in response to the first pulse, extinguishes, and the signal level at output terminal $C_2$ of multivibrator 56 becomes approximately zero. This zero (low) level signal is inverted by inverting amplifier 58, which applies a high level enabling signal to input terminal $E_1$ of AND gate 60. However, since the signal applied to terminal $E_2$ has already returned to a disabling low level, the signal at output terminal $E_3$ of AND gate 60 is still at a low level. This indicates that in the course of a commutation cycle, during that period when both SCR's in one leg of an inverter are ON, i.e. the spanning interval, no fault is detected and no disabling control signal is generated at the output of AND gate 60 as long as the spanning interval was initiated by a first pulse which was simultaneously applied to both the OFF SCR in an inverter leg and the one-shot multivibrator.

However, if a false triggering signal is applied to OFF SCR 16, a first signal indicative of the spanning interval (shown in FIG. 3g) will be generated, and applied to input terminal $E_2$ of AND gate 60 at a time when no first pulse is received at input terminal $C_1$ of one-shot multivibrator 56. The output terminal of the multivibrator will thus be at a low (ground) level, and an enabling (high level) signal will be applied to input terminal $E_1$ from the output of inverting amplfier 58. This will cause generation of a control signal at output terminal $E_3$ of AND gate 60, which will be applied to gating pulse generator 14 to cause the previously described shut down of inverter circuit 10. Thus, the generation of a control signal at the output of AND gate 60 will provide an indication that an OFF SCR in an inverter leg has been triggered ON by a false triggering signal, and/or that a first pulse has been missed and not applied to the gate of an OFF SCR at the initiation of a commutation interval.

Thus, the circuit described in this application provides early detection of a malfunction in the operation of the inverter circuit, which malfunction is caused by the initiation of a spanning interval by a pulse other than a required first pulse. This indicates that an SCR in a leg of the inverter has been turned ON when it should't be turned on, and thereby provides an early indication that the actual output waveform of the inverter circuit is not going to conform to the desired waveform. Upon this early detection of the initiation of the spanning interval due to the turning on of the SCR within a leg of an inverter circuit by a signal other than the required first pulse, a UPS system, which utilizes this inverter, can be removed quickly from operation before it causes a serious problem to a critical load that is being supplied by the UPS system.

While the inverter has been described with reference to a specific self-commutating inverter, it should be understood that other types of inverters could satisfactorily be used.

Although this invention has been described with reference to a specific embodiment thereof, numerous modifications are possible without departing from the invention, and it is desirable to cover all modifications falling within the spirit and scope of this invention.

What we claim as new and desire to secure by Letters Patent of the United States is:

1. A circuit for detecting a malfunction in a self-commutating inverter including a series combination of at least first and second gate controlled rectifiers and a commutating interval current limiting center tapped reactor connected in series with and interposed between said rectifiers, and commutating means connected to the center tap of said reactor, said series combination being connected across a direct current source of potential, comprising:
    a. means coupled to the center tap of said reactor for generating a first signal upon detecting and for the duration of an interval when both of said rectifiers are ON;
    b. means, responsive to a first pulse used to initiate the interval when either of said first and second rectifiers is to be ON,, for generating a second signal having a duration greater than the normal duration of said first signal; and
    c. means responsive to said first and second signals for generating a control signal to cause cessation in the operating of said inverter if said second signal is absent at any time during the occurrence of said first signal.

2. A circuit for detecting a malfunction in a self-commutating inverter according to claim 1, wherein said means for generating said first signal is comprised of:
    a. a voltage divider network having an output terminal at a midpoint junction of said voltage divider and a pair of external terminals connected across the direct current source of potential;
    b. full wave rectifier means having a pair of input and a pair of output terminals, one of said input terminals being connected to the center tap of said reactor and the other of said input terminals being connected to said output terminal of said voltage divider;
    c. a photodiode connected across said output terminals of said full wave rectifier means; and
    d. a phototransistor amplifier, optically coupled to said photodiode, having an output terminals coupled to said control signal generating means, whereby during the time when both of said gate controlled rectifiers are ON, the potential at said output terminal of said voltage divider is equal to the potential at the center tap of said reactor, and no current flows through said photodiode, thereby resulting in the generation of said first signal at said output terminal of said phototransistor amplifier, and during the remaining time interval when only one of said first and second gate controlled rectifiers is ON, the potential at the center tap of said reactor is unequal to the potential at said output terminal of said voltage divider, thereby causing the flow of current through said photodiode, whereupon said first signal at said output terminal of said phototransistor amplifier is extinguished.

3. A circuit for detecting a malfunction in a self-commutating inverter according to claim 1, wherein said means for generating said second signal is comprised of a one-shot multivibrator triggered by the first pulse, said multivibrator having an output terminal.

4. A circuit for detecting a malfunction in a self-commutating inverter according to claim 3, wherein said means for generating said control signal is comprised of:
    a. an inverting amplifier having an input terminal, coupled to said output terminal of said one-shot multivibrator, and an output terminal; and
    b. gating means having a first input terminal coupled to said output of said phototransistor amplifier, a second input terminal coupled to said output terminal of said inverting amplifier, and an output terminal, whereby said control signal is generated at said output terminal of said gating means, when said first signal is applied to said first input terminal of gating means at a time when there is an absence of said second signal at said output terminal of said one-shot multivibrator.

5. A circuit for detecting a malfunction in an inverter including a series combination of at least first and second gate controlled rectifiers, and commutating means coupled to each of said rectifiers, said series combination being connected across a direct current source of potential, comprising:
    a. means coupled to said inverter for generating a first signal upon detecting and for the duration of an interval when both of said rectifiers are ON;
    b. means, responsive to a first transistion used to initiate the interval when either of said first and second rectifiers is to be ON, for generating a second signal having a duration greater than normal duration of said first signal; and
    c. means responsive to said first and second signals for generating a control signal to cause a modification in the operation of said inverter if said second signal is absent at any time during the occurrence of said first signal.

* * * * *

UNITED STATES PATENT OFFICE
CERTIFICATE OF CORRECTION

PATENT NO. : 4,041,365
DATED : August 9, 1977
INVENTOR(S) : STEVEN C. PEAK & THOMAS E. ANDERSON It is certified that error appears in the above–identified patent and that said Letters Patent are hereby corrected as shown below:

Column 7, line 45, delete "ON,," and insert --ON,--.

Column 8, line 6, delete "terminals" and insert --terminal--.

Signed and Sealed this

Fifteenth Day of November 1977

[SEAL]

Attest:

RUTH C. MASON
Attesting Officer

LUTRELLE F. PARKER
Acting Commissioner of Patents and Trademarks